United States Patent [19]

Kruse

[11] 4,097,549
[45] Jun. 27, 1978

[54] POLYMER POLYBLEND COMPOSITION
[75] Inventor: Robert L. Kruse, Springfield, Mass.
[73] Assignee: Monsanto Company, St. Louis, Mo.
[21] Appl. No.: 645,138
[22] Filed: Dec. 29, 1975
[51] Int. Cl.² .............................................. C08L 51/04
[52] U.S. Cl. .............................. 260/876 R; 260/95 C; 260/880 R
[58] Field of Search .............. 260/876 R, 880 R, 95 C
[56] References Cited
U.S. PATENT DOCUMENTS

| 3,243,481 | 3/1966 | Ruffing et al. | 260/880 R |
| 3,488,743 | 1/1970 | Baer et al. | 260/879 |
| 3,658,946 | 4/1972 | Bronstert et al. | 260/876 R |
| 3,868,434 | 2/1975 | Westphal et al. | 260/880 R |
| 3,903,202 | 9/1975 | Carter et al. | 260/880 R |
| 3,928,494 | 12/1975 | Aliberti | 260/876 R |
| 3,928,495 | 12/1975 | Dalton | 260/876 R |
| 3,931,356 | 1/1976 | Dalton | 260/876 R |
| 3,957,916 | 5/1976 | Tanno et al. | 260/876 R X |
| 3,959,408 | 5/1976 | Yusa et al. | 260/876 R |

Primary Examiner—Thomas De Benedictis, Sr.
Attorney, Agent, or Firm—Joseph S. Nelson; William J. Farrington; James C. Logomasini

[57] ABSTRACT

This invention relates to an improved polymeric polyblend characterized by a blend of (A) a polymer of at least one monoalkenyl aromatic monomer having dispersed therein an amount sufficient to toughen said polyblend of a (B) diene rubber, said rubber being dispersed as crosslinked grafted rubber particles wherein said improvement comprises (C) said diene rubber particles having a rubber moiety structured in a novel morphological form comprising rubber fibers or rubber sheets and mixtures thereof.

17 Claims, 5 Drawing Figures

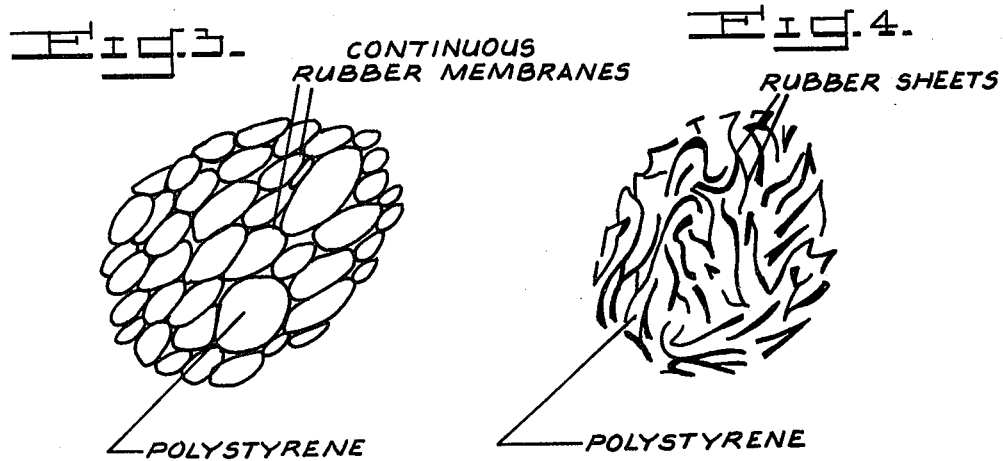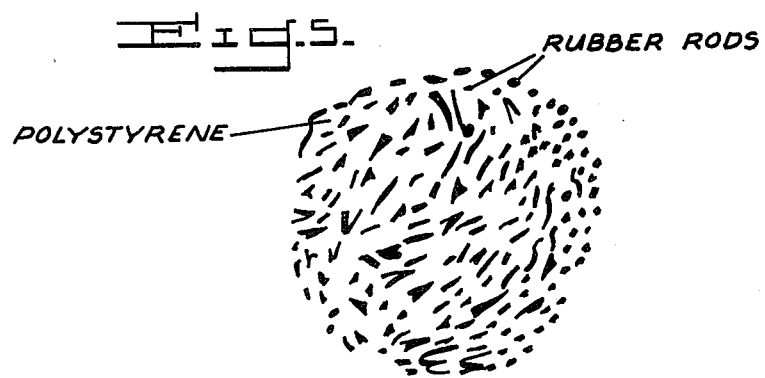

POLYMER POLYBLEND COMPOSITION

BACKGROUND OF THE INVENTION

High impact polystyrene polyblends (HIPS) comprising polystyrene having a rubber phase dispersed therein, as cross-linked rubber particles, are known. Historically, mechanical blends were prepared by melt blending polystyrene with raw rubber which was incompatible and dispersed as crosslinked rubber particles to reinforce and toughen the polymeric polyblend. More recently, HIPS polyblends have ben prepared by mass polymerizing solutions of diene rubber dissolved in styrene monomer in batch reactors wherein the rubber molecules were grafted with styrene monomer forming polystyrene polymer grafts on the rubber along with polystyrene polymer in situ in the monomer. As the polystyrene-monomer phase increases during polymerization the grafted rubber phase inverts readily as rubber particles comprising grafted rubber and occluded polystyrene contained therein with said particles crosslinked to maintain the rubber particles as discrete particles dispersed in the polystyrene which forms a matrix phase of the HIPS polyblend.

A recent publication in "Polymer Engineering and Science", Vol. 14, No. 1, pages 1–11, January 1974 entitled "The Development of Impact Polystyrene-A Review", describes in detail the historical development of HIPS polyblends. Electron microscope micrographs of rubber particles found in conventional HIPS polyblends are shown. Such micrographs reveal rubber particles having occluded polystyrene contained within the interstices of a continuous rubber membrane structure as typical of conventional HIPS polyblends.

U.S. Pat. No. 3,868,434 discloses improved HIPS polyblends wherein superior physical properties are obtained using a particular butadiene rubber having a cis, 1,4 butadiene content of at least 25 percent and a 1,2 addition butadiene content of not more than 10 percent. The polyblend was prepared by catalyzed mass polymerization in a batch process and has conventional rubber particles.

U.S. Pat. No. 3,243,481 discloses a process for preparing HIPS polyblends by continuous mass thermal polymerization providing conventional particles. When such continuous mass polymerization processes are carried out such that the prepolymerization, i.e., the conversion from 10 to 50 percent is carried out continuously in a back-mixing, flow-through, stirred tank reactor using free radical catalysts that have a high grafting efficiency, novel rubber particles are formed that reinforce the HIPS polyblend more efficiently giving improved HIPS polyblends with superior physical properties such as impact strength and gloss.

Analysis of the novel HIPS polyblends of the present invention by the Kato Method, K. Kato, J. Electron Microscopy 14 220 (1965), wherein electron microscope micrographs are analyzed, shows the dispersed rubber particles to have a novel morphological structure as compared to thermally polymerized polyblends by continuous mass polymerization or by batch processes carried out in a stirred tank reactor as contrasted to a continuous flow-through back-mixed stirred reactor.

Analysis reveals that the novel polyblends comprise rubber particles with a rubber moiety structured in new morphological forms comprising rubber fibers or rubber sheets and mixtures thereof. The novel rubber particle structure has been found to provide the HIPS polyblends of this invention with a more efficient rubber particle providing improved physical properties for the polyblend such as gloss, impact strength, melt flow and falling dart impact strength.

By contrast, HIPS polyblends of the prior art have rubber particles structured with relatively large amounts of occluded polystyrene contained in a network of continuous rubber membranes as the only morphological structure. Prior art HIPS polyblends containing such particles only, have lower reinforcing ability for the polyblend and are relatively deficient in flow and gloss.

Accordingly, it is an objective of the present invention to disclose improved HIPS polyblend compositions with dispersed rubber particles having novel morphological structures providing improved physical properties.

It is an objective of the present invention to advance the art of HIPS polyblend compositions by providing novel HIPS polyblend compositions having improved properties over known prior art HIPS polyblends.

SUMMARY OF THE INVENTION

The present invention relates to:

An improved polymeric polyblend composition characterized by a blend of:

A. a polymer of at least one monoalkenyl aromatic monomer having dispersed therein an amount sufficient to toughen said polymer of B. a diene rubber, said rubber being dispersed as crosslinked rubber particles being grafted with said monomer as polymer and having occluded therein said polymer, said particles having a weight average diameter of from about 0.5 to 10 microns, wherein said improvement comprises:

C. said rubber particles having a rubber moiety structured in a morphological form comprising rubber fibres or rubber sheets and mixtures thereof.

BRIEF DESCRIPTION OF THE DRAWINGS

FIG. 3 is a draftsman's diagrammatic reproduction of a rubber particle having continuous rubber membrane morphology, containing occluded polystyrene.

FIG. 4 is a draftsman's diagrammatic reproduction of a rubber particle having rubber sheet morphology containing occluded polystyrene.

FIG. 5 is a draftsman's diagrammatic reproduction of a rubber particle having rubber fibre morphology containing occluded polystyrene.

When the electron micrographs and reproductions are compared, it is noted that those particles represented by FIGS. 3, 4 and 5 have uniquely different morphology. In particular, the particles of FIG. 3 have a continuous rubber membrane morphology whereas FIG. 4 has rubber sheet morphology and FIG. 5 has rubber fiber morphology. All said particles are identifiable in FIGS. 1 and 2 showing electron photomicrographs of actual HIPS polyblends containing the described particles. FIG. 1 contains rubber particles typical of conventional HIPS polyblends whereas FIG. 2 contains rubber particles having the novel morphology of the present invention in combination with rubber particles having continuous rubber membranes.

DESCRIPTION OF THE PREFERRED EMBODIMENTS

THE POLYMER

Figure 1:
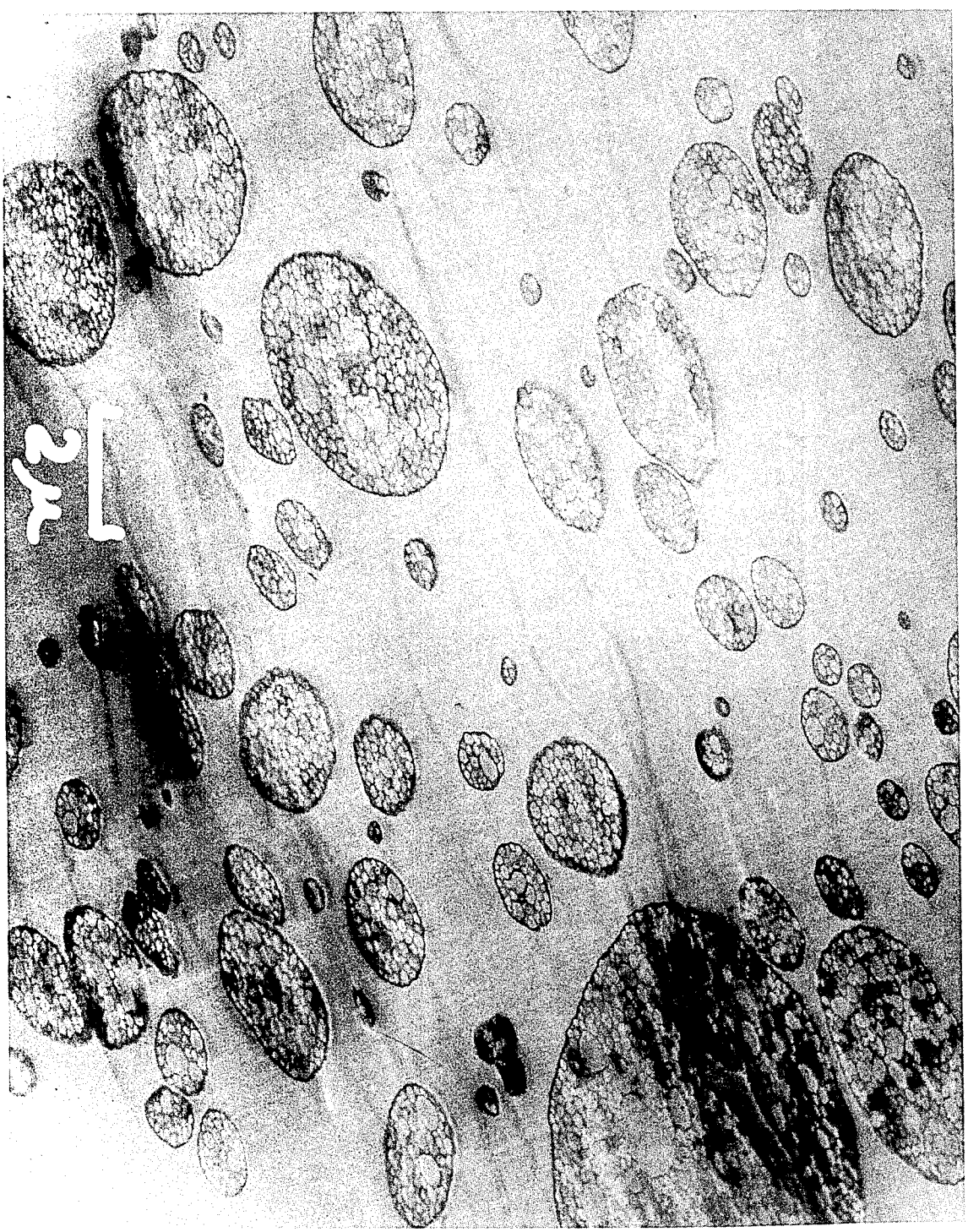
FIG. 1 is an electron micrograph of a conventional HIPS polyblend containing rubber particles having only a continuous rubber membrane morphology containing occluded polystyrene dispersed in a matrix phase of polystyrene.

The polymer is a polymonoalkenyl aromatic polymer comprised of at least one monoalkenyl aromatic monomer of the formula:

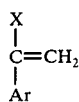

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the polymer are styrene; alpha-alkyl monovinylidene monoaromatic compounds, e.g., alpha-methylstyrene, alpha-ethylstyrene, alpha-methylvinyltoluene, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc. If so desired, mixtures of such monovinylidene aromatic monomers may be employed.

THE RUBBER SUBSTRATE

Exemplary of the various rubbers onto which the monomers can be grafted during polymerization in the presence thereof to produce the grafted rubbers are diene rubbers, natural rubbers, polyisoprene rubbers and mixtures thereof, as well as interpolymers thereof with each other or other copolymerizable monomers.

The preferred substrates, however, are diene rubbers (including mixtures of diene rubbers), i.e., any rubbery polymer (a rubbery polymer having a second order transition temperature not higher than 0° centigrade, preferably not higher than −20° centigrade, as determined by ASTM Test D-746-52T) of one or more of the conjugated, 1,3 dienes, e.g., butadiene, isoprene, 2-chloro-1,3-butadiene, 1 chloro-1,3-butadiene, cyclopentenomer. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alpha-ethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

Although the rubber may contain up to about 2.0 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics.

A preferred group of rubbers are the stereospecific polybutadiene rubbers formed by the polymerization of 1,3-butadiene. These rubbers have a cis-isomer content of about 30–99.5 percent and a trans-isomer content of about 70-2 percent and generally contain at least about 85 percent of polybutadiene formed by 1,4 addition with no more than about 15 percent by 1,2 addition. Mooney viscosities of the rubber (ML-4, 212° F.) can range from about 20 to 70 with a second order transition temperature of from about −50° to −105° C. as determined by ASTM Test D-746-52T.

PROCESS FOR PREPARATION OF HIPS POLYBLEND

One such suitable continuous process for preparing the novel polyblends of the present composition is disclosed in U.S. Pat. No. 3,903,202. The most critical requirement is that the prepolymerization of 10 to 50 percent conversion be carried out in a continuous flow through, stirred tank, back mixing, reactor. High grafting free radical catalysts are used in the polymerization to insure a high level of grafting to the diene rubber. Such catalysts are monomer soluble peroxy types such as tert-butyl perbenzoate, tert-butyl peracetate, dicumyl peroxide, etc. or mixtures thereof. The catalyst is charged with the monomer in amounts of about 0.001 to 3.0 percent by weight based on monomer preferably 0.005 to 1.0 percent depending primarily on the monomer used.

A monomer composition comprising at least one monoalkenyl aromatic monomer having about 2–15 percent by weight of a diene rubber dissolved therein is charged continuously as a monomer-rubber solution to the initial reaction zone. The monomer is polymerized at temperatures of about 110°–145° C. in the first zone converting about 10–50 percent by weight of the monomer to a alkenyl aromatic polymer. At least a portion of the monomer polymerized is grafted as polymer molecules to the diene rubber as a superstrate.

The remainder of the polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer polymer-phase increases and has a volume sightly larger than the monomer-rubber phase, the monomer-rubber phase disperses as rubber-monomer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the monomer-rubber can be varied from a weight average particle diameter of from about 0.5 to 10 microns preferably from 0.5 to 5 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the initial polymerization zone, the continuously charged monomer composition containing 2 to 15 percent by weight diene rubber disperses almost instantaneously, under stirring, forming the rubber-monomer particles which on complete polymerization form discrete rubber particles. The conversion of monomers to polymers in the first reaction zone is controlled between 10–50 percent and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 6 grams for each gram said diene rubber.

The dispersed rubber phase increases the toughness of the polymeric polyblend as measured by is Izod impact strength by Test ASTM D-256-56. It has been found that the impact strength of polyblends increase with the weight percent rubber dispersed in the polyblend in the range of 2 to 15 percent as used in the present invention. The impact strength is also determined by the size of the dispersed rubber particles, with the larger particles providing higher impact strength within in the range of 0.5 to 10 microns measured with a photosedimentometer by the published procedure of Graves, M. J. et.al., "Size Analysis of Subsieve Powders Using a Centrifugal Photosedimentometer," British Chemical Engineering 9:742–744(1964). A Model 3000 Particle Size Analyzer from Martin Sweets Company, 3131 W. Market St., Louisville, Ky. was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used with the range of 0.5 to 5 microns being preferred and 0.8 to 3 microns being most preferred for optimum impact strength and gloss.

Processwise, in the initial reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial reaction zone and throughout the total polymerization process. The rubber particle is also grafted externally stabilizing its structure as to size and its dispersibility in the monomer-polymer phase.

The initial reactor forms a first mixture of a monomer-polymer phase having the rubber phase described dispersed therein. The first mixture is charged to a staged isobaric stirred reaction zone as a second zone. The first mixture is polymerized by progressive multistage substantial linear flow polymerizations with the conversion of polymer advancing from about 10–50 percent conversion in the first stage to 50 to 90 percent conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

It has been found that in the initial reaction zone as the rubber particle is formed, that the rubber-monomer particle has a monomer content that corresponds to the monomer content of the monomer-polymer phase. The rubber-monomer particle will stabilize at this level as the monomer polymerizes inside the rubber particle and grafted polymer is formed on the rubber. Hence, it has been found that the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage less monomer is occluded in the rubber phase particle on dispersion. As described earlier, the first mixture is polymerized in the staged linear flow second zone and the percent by weight of polymer being formed is progressively higher with each stage having a slightly higher polymer content. The staged linear progressive polymerization of the monomer giving desirable polymers but was found unexpectedly to preserve the integrity of the rubber particles. Although not completely understood, as the rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the rubber particle and the monomer-polymer phase at about the same rate, hence, the total polymer content of the occluded monomer-polymer phase of the rubber particle is about the same as polymer content of the monomer-polymer phase and monomer is not extracted, hence, the weight percent of occlusion is stabilized and remains substantially constant after formation in the initial reactor.

It has been found possible to analyze the amount of total occluded polymer phase and grafted polymers. The final polymerized polyblend product (1 gram) are dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\% \text{ Dry gel in Polyblend} = \frac{\text{Weight of dry gel}}{\text{Weight of polyblend}} \times 100$$

$$\% \text{ Graft and Occlusions in Rubber} = \frac{\% \text{ dry gel} - \% \text{ rubber}}{\text{Percent rubber*}} \times 100$$

$$\text{Parts** by weight of graft polymer and occluded polymer per unit weight of rubber} = \frac{\% \text{ dry gel} - \% \text{ rubber}}{\text{Percent rubber}}$$

*Percent rubber determined by infra-red spectrochemical analysis of the dry gel
**The present invention preferably has present about 0.5 to 5 grams of occluded and grafted polymer per gram of diene rubber particle.

The swelling index of the rubber graft particles is determined by taking the dry gel above and dispersing it in toluene for 12 hours. The gel is separated by centrifuge and the supernatant toluene drained free. The wet gel is weighed and then dried in a vacuum oven for 12 hours at 50° C. and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 6 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the monomer as it polymerizes to a polymer phase in the rubber-monomer particle. Generally, the conversion of monomer to polymer in the occlusion follows the rate of conversion of monomer to polymer in the monomer-polymer phase. In devolatilization, the temperatures of the second mixture is raised to about 200° to 250° C. for sufficient time to crosslink the rubber particles such that they have a swelling index of from about 7 to 20 preferably from about 8 to 16.

Preferably, the combined polymer of the matrix phase of the polyblends produced by this invention have a dispersion index (Mw/Mn), wherein Mw is a weight average molecular weight and Mn is a number average molecular weight, ranging from about 2.0 to 4.0 preferably 2.2 to 3.5. The dispersion index is well known to those skilled in the art and represents the molecular weight distribution with the lower values having narrow molecular weight distribution and higher values having broader molecular weight distribution. The average molecular weight of the combined polymer of the matrix phase preferable range from 40,000 to 70,000 Staudinger.

GRAFTED RUBBER PHASE

As described in the process for preparing said HIPS polystyrene polyblends, the rubber becomes dispersed as grafted crosslinked rubber particles. The rubber particles contain occluded polymer as well as grafted polymer. The rubber particle having continuous rubber membrane morphology contain from about 0.5 to 2.5 parts of grafted and occluded polymer per part of rubber whereas the rubber particles having rubber fibre and rubber sheet morphology contain about 3.0 to 6.0 parts of grafted and occluded polymer per part of rubber. Said particle having present said grafted and occluded polymer in amounts ranging from about 0.5 to 6.0 parts per part of rubber in said novel HIPS polyblend. The rubber particles have a particle size dispersion index of about 2.0 to 6.0 with the particle size dispersion index being the ratio of weight average particle size diameters to number average particle size diameters. The weight average particle size diameter can range from about 0.5 to 10 microns, preferably from about 0.5 to 5 and most preferably from about 0.8 to 3.0 microns for an optimum balance of gloss and impact strength. The number average particle size diameter can be determined in the test as described above and represents the average particle size diameter based on the number of particles in the population and ranges from about 0.20 to 1.50 microns. The rubber membranes, rubber fibres and rubber sheets have an average thickness ranging from about 0.01 to 0.10 microns.

EXAMPLES 1 - 2

Example 1 will be run with thermal catalysis and Example 2 with the use of free radical generating catalyst that will activate the polymerization of the monomers and also extract hydrogen from the rubber and cause it to be grafted. Such catalysts have been described as grafting catalysts and are of the type hereintofore described. Novel rubber particles were found in the case of polymerization with free radical catalyst as contrasted with thermal polymerization, giving greatly improved rubber efficiencies and toughness of high utility.

EXAMPLE 1

THERMAL POLYMERIZATION

A rubber solution consisting of 8 parts by weight of stereospecific polybutadiene rubber in 92 parts by weight of styrene monomer is prepared by agitating the mixture at 40° C. for 8 hours. The rubber used contains approximately 35 percent cis-1,4 structure; approximately 55 percent trans-1,4 structure, and approximately 10 percent vinyl-1,2 structure having a Mooney viscosity of the rubber (ML-4, 212° F.) at 55. To the above monomer is added 0.1 part by weight of octadecyl 3-(3', 5'-di-tertbutyl-4-hydroxyphenyl) propionate. This monomer composition is fed continuously at approximately 65 lbs./hr. to a 30 gal. anchor-agitated initial reactor $R_1$ operated at approximately 50 percent fillage and 130° C. under 5 psig. nitrogen pressure. The agitator turns at 50 rpm. A reacting mixture containing approximately 25 percent polystyrene is pumped from the above reactor at a continuous rate such as to maintain essentially constant fillage therein and flows to the inlet of the second reactor, a single stage stirred tank reactor $R_2$. Also added to the second reactor is a stream of approximately 4 parts of white mineral oil. The second reactor has approximately a 50 gal. capacity and operates at about 40 percent fillage. The pressure in this reactor is maintained at approximately 18.5 psia.

The reacting mixture in the reactor is maintained at about 154° C. and contains about 64 percent polystyrene. Styrene vapor evaporated from the second reactor to cool the reaction is condensed and the condensate is recycled to the reactor. The reacting mixture is pumped continuously from the reactor at a rate to maintain essentially constant fillage in the second reactor and is delivered to two in line devolatilizers operating at 210° C. and 14 mm Hg. The devolatilized melt is fed from the devolatilizer to an extruder which forms it into a plurality of strands which are then cooled and cut into pellets. The polymer of the polyblend has a Staudinger molecular weight of about 49,000 and a dispersion index of about 3.2. Analysis of the polyblend is shown as data tabulated in Table 1.

EXAMPLE 2 CATALYTIC POLYMERIZATION

The reaction is carried out in the same apparatus as Example 1 with the same procedures using 0.02 percent by weight of t-butyl peracetate catalyst (based on the rubber solution charged) in the rubber solution. The temperature in $R_1$ is 115° C. operating at a conversion of 16 percent with $R_2$ operating at 154° C. and 64 percent conversion.

TABLE 1

|  | Example 1 | Example 2 |
|---|---|---|
| % Rubber | 8.0 | 8.0 |
| Dw(1) | 1.4 | 1.0 |
| % gel | 14.0 | 16.0 |
| % Polystyrene | 86.0 | 84.0 |
| % Graft and Occlusions | 6.0 | 8.0 |
| Melt Index 165° C. | 1.1 | 1.5 |
| Izod Impact Strength ft.lbs./in. | 1.5 | 1.5 |
| kgm/2.5 cm. | 0.22 | 0.22 |
| Gloss | 35 | 65 |

(1)Dw - weight average particle size in microns

It is evident from the data that the catalyzed polyblend of Example 2 has a much higher gloss and has relatively high impact strength considering that the rubber particle size is considerably smaller than those of Example 1. The rubber particles of Example 1 are of the morphology shown in FIG. 1 whereas the rubber particles of Example 2 are of the morphology shown in FIG. 2 providing the polyblend with high impact strength, excellent gloss and high melt flow.

EXAMPLES 3 – 4

Thermal polymerization is carried out in Example 3 and catalyzed polymerization in Example 4. In both Examples, the first reactor ($R_1$) was a continuous, flow through, back mixed, stirred tank reactor (CSTR) feeding a second reactor ($R_2$) a continuous staged linear flow reactor (CSLR) using the procedures and apparatus as disclosed in U.S. Pat. No. 3,903,202. The details on the apparatus on operating conditions along with test data on the polyblends are detailed in Table 2.

TABLE 2

|  | Example 3 | Example 4 |
|---|---|---|
| Catalysis | thermal | 0.02% in $R_1$[(1)] |
| % Rubber | 6.0 | 6.0 |
| Feed Rate (lbs./hr.) | 102 | 102 |
| l/hr. | 390 | 390 |
| $R_1$(CSTR) gal. | 30 | 30 |
| l | 127 | 127 |
| Temperature $R_1$ | 135° C. | 126° C. |
| Conversion $R_1$ | 27% | 18% |
| $R_2$(CSLR) gal. | 50 | 50 |
| l | 190 | 190 |
| Temperature $R_2$° C. | 161° | 161° |
| Conversion $R_2$% | 75 | 72 |
| Devolatilization ° C. | 260° | 260° |
| Dw (microns) | 1.9 | 1.5 |
| % gel | 14 | 18 |
| Melt Index | 2.0 | 3.0 |
| Izod Impact Strength ft.lbs./in. | 1.1 | 1.1 |
| kgm/2.5 cm. | .15 | .15 |
| Gloss | 30 | 75 |

[(1)]t-butyl peracetate

Figure 2:
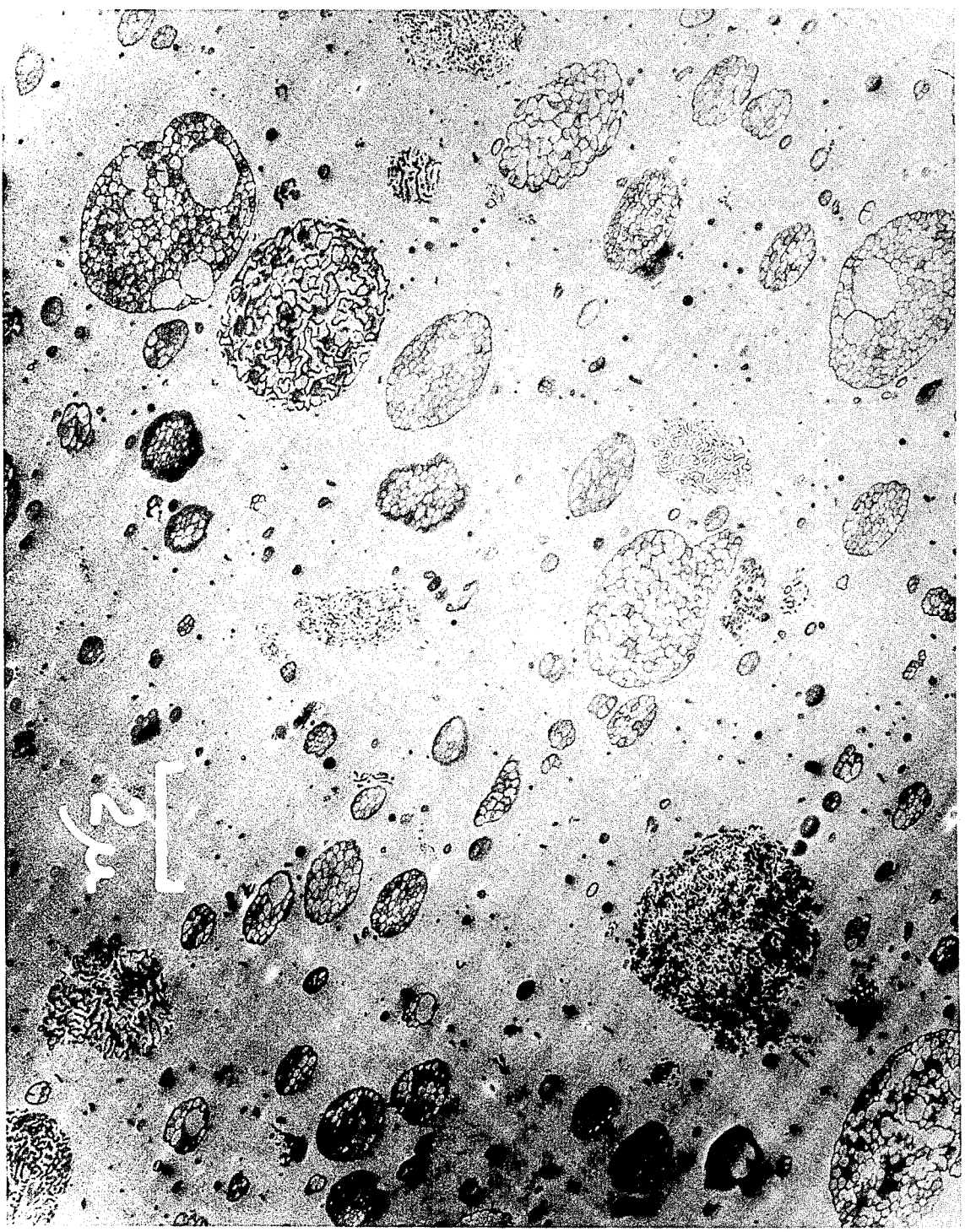
FIG. 2 is an electron photomicrograph of the novel HIPS polyblend composition comprising
  (a) polystyrene matrix phase having dispersed therein:
  (b) rubber particle having only a continuous membrane morphology and containing occluded polystyrene;
  (c) rubber particles having essentially only rubber fiber morphology and containing occluded polystyrene, and
  (d) rubber particles having essentially only rubber sheet morphology and containing occluded polystyrene.

It is evident from the data that Example 4 carried out with catalysts had higher percentages of gels or grafting yet the gloss and melt index or flow was considerably improved with the impact strength being high for the amount of rubber and smaller particle size. The morphology of the rubber particle in Example 4 was found to be that described in FIG. 2 whereas that of Example 3 was that as described in FIG. 1 showing the ability of the rubber particles having the novel morphology to provide superior properties for the polyblend.

EXAMPLES 5 – 6

Example 5 is a catalyzed polymerization carried out by continuous mass polymerization as in Example 4. A catalyzed polymerization was carried out in Example 6 using a mass/suspension process as disclosed in U.S. Pat. No. 3,488,743 wherein the rubber solution was batch polymerized in a CSTR reactor to about 30 percent conversion using about 0.02 weight percent t-butyl perbenzoate as a catalyst followed by suspending the reacting mixture in an aqueous suspension followed by batch polymerization to about 99 percent conversion as polyblend beads. The details on operation, apparatus and test data of the polyblends are shown in Table 3.

TABLE 3

|  | Example 5 | Example 6 |
|---|---|---|
| % Rubber | 6 | 6 |
| Feed Rate lbs./hr. | 135 | batch |
| l/hr. | 515 |  |
| $R_1$(CSTR) gal. | 100 | batch |
| l | 380 |  |
| Temperature R ° C. | 115 | 115 |
| Conversion % | 24 | 30 |
| $R_2$(CSLR) gal. | 50 | batch |
| l | 190 |  |
| Temperature $R_2$ ° C. | 158 | 155 |
| Conversion % | 70 | 99.8 |
| Devolatilization ° C. | 220 | none |
| Melt Index | 3.4 | 2.4 |
| % gel | 17.4 | 18.5 |
| Dw | 1.3 | 2.4 |
| Swelling Index | 9.1 | 7.4 |
| Izod Impact Strength ft.lbs./in. | 1.7 | 1.1 |
| kgm/2.5 cm. | .24 | .15 |
| Falling Dart Impact Strength | 32 | 23 |
| Gloss | 80 | 45 |

Electron microscope micrographs tests were carried out on the polyblends of Example 5 and 6. Example 5 rubber particles typical of those shown in FIG. 2 whereas Example 6 had rubber particles typical of those shown in FIG. 1. It is evident from the data that those particles in Example 5 having the novel morphology wherein the rubber particles had rubber fibres and rubber sheet that these particles provided the polyblend with superior properties when present in combination with those particles having continuous rubber membranes. By contrast, the rubber particles in Example 6 have only the continuous rubber membrane morphology. In particular, the impact strength, gloss, falling dart impact strength and melt index were all considerably improved considering that the weight average particle size of the rubber particles were smaller indicating greater rubber toughening efficiency for novel rubber particles.

What is claimed is:

1. An improved polymeric polyblend composition characterized by a blend of:
   A. a polymer of at least one monoalkenyl aromatic monomer having dispersed therein an amount sufficient to toughen said polymer of
   B. a diene rubber, said rubber being dispersed as crosslinked rubber particles being grafted with said monomer as polymer and having occluded therein said polymer, said particles having a weight average diameter of from about 0.5 to 10 microns, wherein said improvement comprises:
   C. said rubber particles having a rubber moiety structured in a morphological form comprising rubber fibres or rubber sheets and mixtures thereof said polymeric polyblend being prepared by polymerizing continuously a solution of said monoalkenyl aromatic monomer and said diene rubber under catalytic conditions with back mixed agitation to about 10 to 50% conversion; then discontinuing such agitation and continuing the polymerization of said solution until the monomer is substantially polymerized; then heating and separating said polyblend from said monomer.

2. A polyblend composition of claim 1, wherein said rubber particles have said rubber moiety structured in a morphological form comprising (1) rubber fibres or (2) rubber sheets and mixtures thereof in combination with rubber particles having said rubber moiety structured in the form of (3) continuous rubber membranes.

3. A polyblend composition of claim 2, wherein from about 30–70 percent by weight of said rubber particles have the form of (1) or (2) and mixtures thereof and wherein from about 30 to 70 percent by weight of said particles have the form of (3).

4. A polyblend of claim 1, wherein said monoalkenyl aromatic monomer is selected from the group consisting of styrene, a-methyl styrene, chlorostyrene, dichlorostyrene, bromostyrene or dibromostyrene and mixtures thereof.

5. A polyblend of claim 1, wherein said diene rubber is selected from the group consisting of polybutadiene, polyisoprene, poly-2-chlorobutadiene, polypentenomer, copolymers and block copolymers of butadiene-styrene, butadiene-chloroprene, chloroprene-styrene, chloroprene-isoprene, 2-chlorobutadiene-1-chlorobutadiene and mixtures thereof.

6. A polyblend of claim 1, wherein said diene rubber is polybutadiene.

7. A polyblend of claim 4, wherein said polybutadiene rubber has a cis isomer content of about 30 to 98 percent and a Tg range of from about $-50°$ C. to $-105°$ C.

8. A polyblend of claim 1, wherein said monoalkenyl aromatic monomer is styrene.

9. A polyblend of claim 1, wherein said polymer has an average molecular weight of 40,000 to 70,000 Staudinger and a molecular weight dispersion index of 2.2 to 3.5.

10. A polyblend of claim 1, wherein said particles have present said graft and occluded polymer in amounts ranging from 0.5 to 6.0 parts per part of rubber moiety.

11. A polyblend of claim 8, wherein said rubber particles having continuous rubber membrane morphology have present from about 0.5 to 2.5 parts of grafted and occluded polymer per part of rubber and wherein said rubber particles having rubber fibre and rubber sheet morphology have present from about 3.0 to 6.0 parts of grafted and occluded polymer per part of rubber.

12. A polyblend of claim 1, wherein said polyblend has from about 1 to 15 percent by weight of said diene rubber moiety dispersed as crosslinked rubber particles.

13. A polyblend of claim 1, wherein said crosslinked rubber particles have a swelling index of from about 7 to 30.

14. A polyblend of claim 1, wherein said particle size dispersion index is about 2.0 to 6.0.

15. A polyblend of claim 1, wherein said rubber fibres, said rubber sheets and said continuous rubber membranes have a average thickness of from about 0.01 to 0.10 microns.

16. A polyblend of claim 1 wherein said polyblend is prepared under catalytic conditions which include the use of monomer soluble free radical peroxy catalysts in amounts of from about 0.001 to 3.0% by weight based on the weight of the monomer.

17. A polyblend of claim 16 wherein said polyblend is prepared under catalytic conditions which include the use of peroxy catalysts selected from the group consisting of tert-butyl perbenzoate, tert-butyl peracetate, and dicumyl peroxide or mixtures thereof.

* * * * *